United States Patent
Qian et al.

(10) Patent No.: US 9,148,778 B2
(45) Date of Patent: Sep. 29, 2015

(54) ACTIVATING A MOBILE TERMINAL FROM MOBILE NETWORK SIDE

(71) Applicant: International Business Machines Corporation, Armonk, NY (US)

(72) Inventors: Jun Qian, Beijing (CN); Wei Sun, Beijing (CN); Haitao Xu, Beijing (CN); Xiaoyan Zhang, Beijing (CN); Bing Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 13/929,402

(22) Filed: Jun. 27, 2013

(65) Prior Publication Data

US 2014/0003372 A1    Jan. 2, 2014

(30) Foreign Application Priority Data

Jun. 29, 2012 (CN) .......................... 2012 1 0226154

(51) Int. Cl.
*H04W 8/22* (2009.01)
*H04L 12/58* (2006.01)
*H04W 8/26* (2009.01)
*H04L 29/06* (2006.01)
*H04W 8/24* (2009.01)

(52) U.S. Cl.
CPC .................. *H04W 8/22* (2013.01); *H04L 51/04* (2013.01); *H04L 65/1073* (2013.01); *H04W 8/265* (2013.01); *H04L 51/38* (2013.01); *H04W 8/245* (2013.01)

(58) Field of Classification Search
CPC ........ H04W 8/22; H04W 8/265; H04L 51/04; H04L 65/1073

USPC .............. 370/252, 329, 310.2, 328, 338, 331, 370/395.4; 455/436

See application file for complete search history.

(56) References Cited

U.S. PATENT DOCUMENTS

| | | | |
|---|---|---|---|
| 7,408,948 B2 * | 8/2008 | Lopponen et al. | ............ 370/433 |
| 7,715,868 B2 | 5/2010 | Zhao et al. | |
| 7,724,711 B2 * | 5/2010 | Haumont | ...................... 370/338 |
| 7,774,007 B2 | 8/2010 | Backholm et al. | |
| 7,904,101 B2 | 3/2011 | Backholm | |

(Continued)

OTHER PUBLICATIONS

Henry Haverinen et al., "Energy Consumption of Always-On Applications in WCDMA Networks," IEEE, 2007.

*Primary Examiner* — Warner Wong
(74) *Attorney, Agent, or Firm* — Roy W. Truelson; James R. Nock (57) ABSTRACT

Disclosed is a method of activating a mobile terminal from mobile network side and a mobile application gateway system. The method comprises: receiving, by a mobile application gateway, a request for activating the mobile terminal, the request including an unique identification number of the mobile terminal; querying, by the mobile application gateway, a HLR for address of a SGSN where the mobile terminal is located; returning, by the HLR, the queried address of SGSN to the mobile application gateway; sending, by the mobile application gateway, the request for activating the mobile terminal to the SGSN; issuing, by the SGSN, a request to the mobile terminal, requiring the mobile terminal to issue a mobile terminal initiated PDP context activation request. The method enables an instant messaging user at a mobile terminal to automatically open an IP connection if there is any message to be received after the IP connection is closed.

8 Claims, 8 Drawing Sheets

(56) References Cited

U.S. PATENT DOCUMENTS

| | | | |
|---|---|---|---|
| 2002/0150092 A1* | 10/2002 | Bontempi et al. | 370/389 |
| 2003/0002480 A1* | 1/2003 | Giustina et al. | 370/352 |
| 2004/0148425 A1* | 7/2004 | Haumont et al. | 709/236 |
| 2004/0228347 A1* | 11/2004 | Hurtta et al. | 370/395.2 |
| 2004/0259532 A1* | 12/2004 | Isomaki et al. | 455/412.1 |
| 2005/0249238 A1* | 11/2005 | Haumont | 370/466 |
| 2006/0023663 A1* | 2/2006 | Kim et al. | 370/329 |
| 2007/0053326 A1* | 3/2007 | Ala-Luukko | 370/335 |
| 2007/0165645 A1* | 7/2007 | Zhang et al. | 370/395.2 |
| 2008/0059582 A1 | 3/2008 | Hartikainen et al. | |
| 2009/0170512 A1 | 7/2009 | Regnier et al. | |
| 2010/0214924 A1 | 8/2010 | Sendra Alcina et al. | |
| 2011/0070906 A1* | 3/2011 | Chami et al. | 455/507 |
| 2012/0129517 A1* | 5/2012 | Fox et al. | 455/425 |
| 2013/0188549 A1* | 7/2013 | Busropan et al. | 370/312 |

* cited by examiner

ACTIVATING A MOBILE TERMINAL FROM MOBILE NETWORK SIDE

TECHNICAL FIELD

The present invention relates to instant message service in a mobile network, and more specifically, to a method of activating a mobile terminal from mobile network side and a mobile gateway system.

BACKGROUND

Nowadays, a variety of so-called "always online" application programs such as instant message (IM), etc., have been widely used by mobile users to acquire information at anytime and anywhere, so as to keep real-time communication with other mobile users. To remain online all the time, a mobile device has to keep constant IP connectivity via wireless data service, which is expensive and power-consuming from user's perspective, and waste of bandwidth, IP addresses and other resources from wireless operator's perspective. To save money, power and resources, an IM client can offline itself automatically after the user is inactive for a certain period of time, and close the IP connectivity, but the user will be unreachable and lose the benefit of real-time communication brought by instant messaging.

Thus, a solution is needed that enables a user of instant message of a mobile terminal to automatically open an IP connection when there is an instant message to be received after the IP connection is closed.

SUMMARY

In order to solve problems existing in the art, by modifying operation at mobile network side, user of instant message of a mobile terminal is enabled to automatically open IP connection when there is an instant message to be received after the IP connection is closed.

According to an aspect of the present invention, there is provided a method of activating a mobile terminal from mobile network side, comprising:

receiving, by a mobile application gateway, a request for activating the mobile terminal, the mobile terminal having no IP connection, the request includes an unique identification number of the mobile terminal;

querying, by the mobile application gateway, a Home Location Register (HLR) for address of a Servicing GPRS Supporting Node (SGSN) where the mobile terminal is located by utilizing the unique identification number of the mobile terminal;

returning, by the HLR, the queried address of SGSN to the mobile application gateway;

sending, by the mobile application gateway, the request for activating the mobile terminal to the SGSN; and issuing, by the SGSN, a request to the mobile terminal, requiring the mobile terminal to issue a request for activating a Packet Data Protocol (PDP) context to the SGSN.

According to another aspect of the present invention, there is provided a mobile application gateway system, comprising:

a request receiving module configured to receive a request for activating a mobile terminal, the request includes an unique identification number of the mobile terminal;

a query sending module configured to query a Home Location Register (HLR) for an address of a Servicing GPRS Supporting Node (SGSN) where the mobile terminal is located by utilizing the unique identification number of the mobile terminal;

a query receiving module configured to receive address of the Servicing GPRS Supporting Node (SGSN) queried by the HLR; and an activation request sending module configured to send the request for activating the mobile terminal to the SGSN.

According to still another aspect of the present invention, there is provided a method of using an instant message server, comprising:

storing an unique identification number of a mobile terminal in response to login of an instant message client running on the mobile terminal;

modifying status of the instant message client as "saving mode" in response to receiving a request for transferring status of the instant message client into "saving mode"; and sending a request for activating the mobile terminal to a mobile application gateway in response to receiving an instant message sent to the instant message client whose status is "saving mode", the request includes the unique identification number of the mobile terminal.

According to yet another aspect of the present invention, there is provided an instant message server, comprising:

a logging module configured to store an unique identification number of a mobile terminal in response to receiving login of an instant message client running on the mobile terminal;

a status recording module configured to modify status of the instant message client as "saving mode" in response to receiving a request for transferring status of the instant message client into "saving mode"; and an activation request sending module configured to send a request for activating the mobile terminal to a mobile application gateway in response to receiving an instant message sent to the instant message client whose status is "saving mode", the request includes the unique identification number of the mobile terminal.

BRIEF DESCRIPTION OF THE SEVERAL VIEWS OF THE DRAWINGS

Through the more detailed description of some embodiments of the present disclosure in the accompanying drawings, the above and other features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
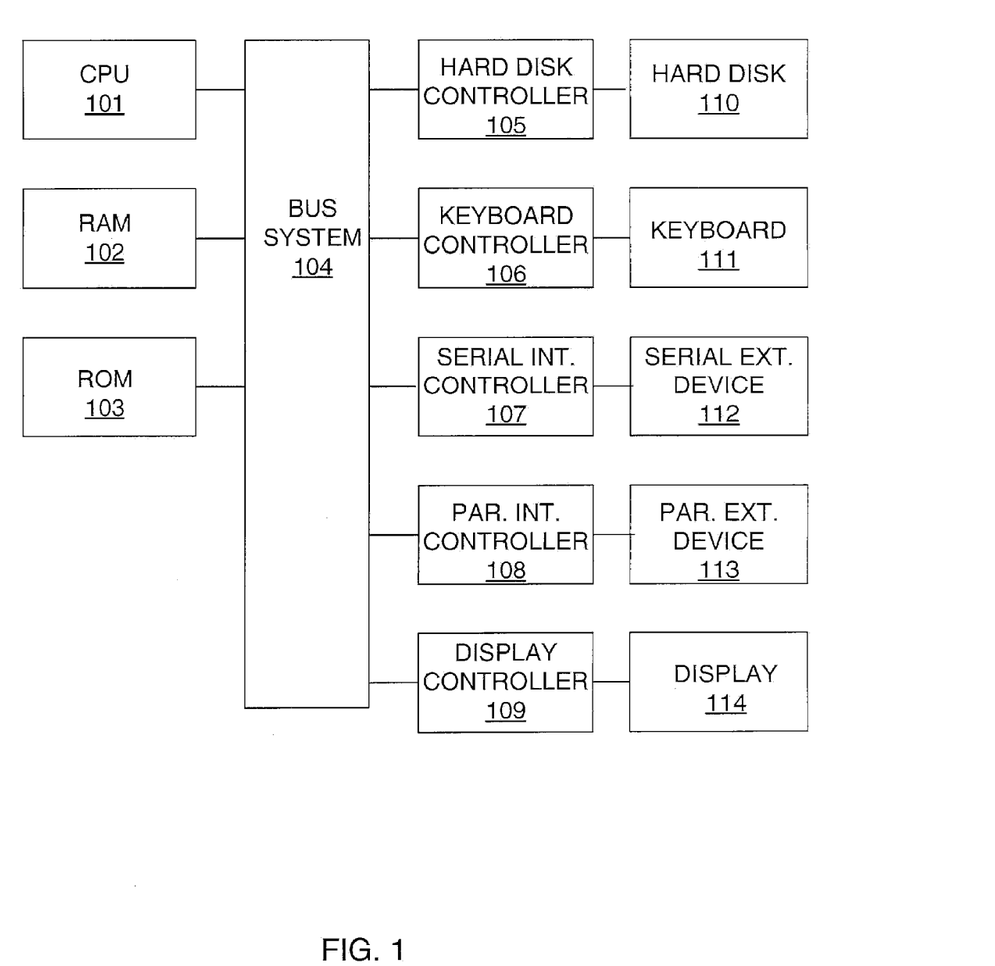
FIG. 1 shows a diagram of an exemplary computer system 100 which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113, and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Generally, various so-called "always online" application programs running on a mobile terminal each keeps a TCP/IP connection with its server, they frequently interact with the servers and consume a significant amount of bandwidth and power.

To solve this problem, current intelligent pushing platforms of various popular mobile terminal operating systems have proposed to uniformly maintain one IP connection at the mobile terminal, so as to be collectively used by the mobile terminal in accessing all the application programs. A mobile terminal manufacturer or operating system manufacturer establishes a dedicated server responsible for completing pushing tasks, and a third party application server just needs to send a pushing request to a pushing server. At mobile terminal side, the mobile terminal constantly communicates with the pushing server by keeping a fixed IP address therewith and monitors an agreed port. After a server message is pushed to the mobile terminal, the mobile terminal assigns it to a corresponding application program for processing. When the pushed information arrives, the terminal will prompt the user to open the application program even if the corresponding application program is in closed state, and the information will be received after the application program is opened. Its flow will be described below by taking a mobile terminal accessing an instant message application program for example:

1. When a user logs in a push version instant message application program on a mobile terminal, the instant message application program client will send a device token of that mobile terminal and a user's instant message ID to an instant message server.
2. When there is a new message, the push version instant message server examines target instant message user ID in that message and queries for device token of the corresponding target terminal, then sends the device token together with the message to a pushing server established by the manufacturer of the mobile terminal.
3. After the pushing server established by the manufacturer of the mobile terminal receives the new message, it finds current IP address of the mobile terminal based on the device token. If the mobile terminal has no IP connection, or even it is not powered on at all, then the pushing server stores the new message, and pushes the message when the mobile terminal is online; if the mobile terminal is online, then the message is pushed immediately.

In the above steps, a mobile network provides an IP connection between the mobile terminal and the pushing server, the mobile terminal needs to keep that IP connection all the time in order to realize real-time message pushing, which not only consumes power of the mobile terminal, but also occupies IP address of the mobile network, thereby causing waste in resources.

Another solution is to release IP connection when a mobile terminal is inactive to save network resource. When a mobile network receives an instant message sent to an offline user, the mobile network sends it to the user by using a short message; the user may open an IP connection after he/she sees the short message, log into the instant message server, and then may start instant message communication. Such short-message-notification solution needs user to manually click and open an IP connection, and length of content bearable by a short message is limited. A solution in which an IP connection is opened automatically after a short message is received needs the mobile terminal to monitor all incoming short messages, and a message is regarded as a notification short message if content or originating number thereof is special, such that an IP connection is automatically opened. This behavior is not standard and is very inconvenient in case there is a need to modify originating number; furthermore, special consideration needs to be taken in security configuration.

It is contemplated in the present invention that, if a mobile terminal has no instant message communication for a long period of time and also there is no other network application program that is currently running, GPRS service of that mobile terminal may be closed and IP network connection may be disconnected; hereafter, when the instant message server receives a message for that instant message client, it will notify the mobile network to wake up that mobile terminal through an interface provided by the mobile network, so as to make that mobile terminal automatically re-establish network connection and automatically log into the instant message server, thus obtaining the sent message and performing further instant message communication. As compared to the short-message-notification solution in prior art, the present invention is to make modification at network side. The mobile terminal simply realizes an inverse activation flow according to standard. This is much easier than deploying an application program on all the mobile terminals, and the invention is so-called "installed once, runs everywhere".

The mobile network mentioned above may be a GPRS network or a 3G network. Since a GPRS network and a 3G network may share a same packet domain core network, the present invention only involves operation on packet domain core network, thus the two are collectively referred to as packet domain core network, and the invention does not distinguish between access technologies.

General Packet Radio Servicing (GPRS) is a packet data carrier service. It provides with a mobile terminal capability of accessing an external packet network (such as Internet) through a mobile network. It is designed to be wireless access technology independent, and a common packet domain core network may provide GPRS service for both 2.5G (GERAN) and 3G (UTRAN) wireless access network. A packet domain core network comprises functional entities such as Serving GPRS Supporting Node (SGSN) and Gateway GPRS Supporting Node (GGSN) etc.

First, basic concepts in wireless network technical field need to be learned in realizing the invention will be introduced below.

Open Service Access (OSA):

OSA defines an architecture that enables operator and third party application provider to make use of functionality offered by a mobile network through an open standardized interface; i.e., the OSA APIs and Parlay X web Services. Network functionality offered to applications is defined in terms of a set of Service Capability Features (SCFs), these SCFs provide an interface for network capabilities, which is accessible to applications through the OSA interface for various service development. OSA is defined in 3GPP TS 23.198. In a mobile network, these interfaces are typically packaged by a mobile application gateway (also referred to as OSA application gateway), to provide Web Service or API calling interface for an external application program.

Home Location Register (HLR):

HLR is the master database of a user. It is responsible for storing subscription data of its managed user and location information of mobile user, for example, user identity, number, address information, user profile, user location information at inter-system level, etc., such that call for a mobile terminal can be established. The HLR integrates Home Location Register and Authentication Central together and provides functions such as location change roaming management, authentication, calling, etc.; HLR also supports rich supplementary services such as call forwarding, call barring, calling number displaying and limiting, short message and so on. The HLR provides an interface which can be used to query for current SGSN address of a certain mobile user. After receiving a query, the HLR will return address of the SGSN where that mobile terminal is located.

Serving GPRS Supporting Node (SGSN):

It forwards messages issued or received by a mobile terminal within a geographical range for which the SGSN is responsible. SGSN's task comprises packet routing and transporting, mobility management, logical link management, identity authentication and billing function. A location register module of SGSN stores location information and user profile of all GPRS users registered within current SGSN, such as IMSI number of a mobile terminal (International Mobile Subscriber Identification Number, which is a mark to distinguish between mobile users and is stored in SIM card, can be used to distinguish valid information of a mobile user), address used in a data network etc. The SGSN provides an interface which can be used by HLR or OSA application gateway to request a mobile terminal to initiate PDP context activation and re-establish an IP connection. In response to that request, the SGSN will start that process.

Gateway GPRS Supporting Node (GGSN):

GGSN is a main component of the GPRS network, which is actually a gateway or a router. The GGSN is responsible for the interworking between the GPRS network and external packet switched networks. From an external packet switched networks point of view, the GGSN is a router to a sub-network, because the GGSN 'hides' the GPRS infrastructure from the external packet switched network. On the other hand, the GGSN is responsible for routing packets originated from a mobile terminal to the right network. The GGSN enables user of a mobile terminal to keep network connection during roaming.

The Packet Data Protocol (PDP) Context:

The PDP context is a data structure used in SGSN and GGSN, in which session information of mobile user's current active session is stored. When a mobile user wants to use GPRS, he/she must first attach to the mobile network and activate a PDP context. During PDP activation, a PDP context will be allocated for user in the SGSN and GGSN currently serving that user. PDP context activation procedure is a process in which a mobile terminal acquires an IP address and establishes an IP connection.

In the present invention, the unique identification number of a mobile terminal is Mobile Subscriber ISDN number (MSISDN number, which is "mobile phone number" as commonly known) or International Mobile Subscriber Identification number (IMSI number) of that mobile terminal.

Figure 2:
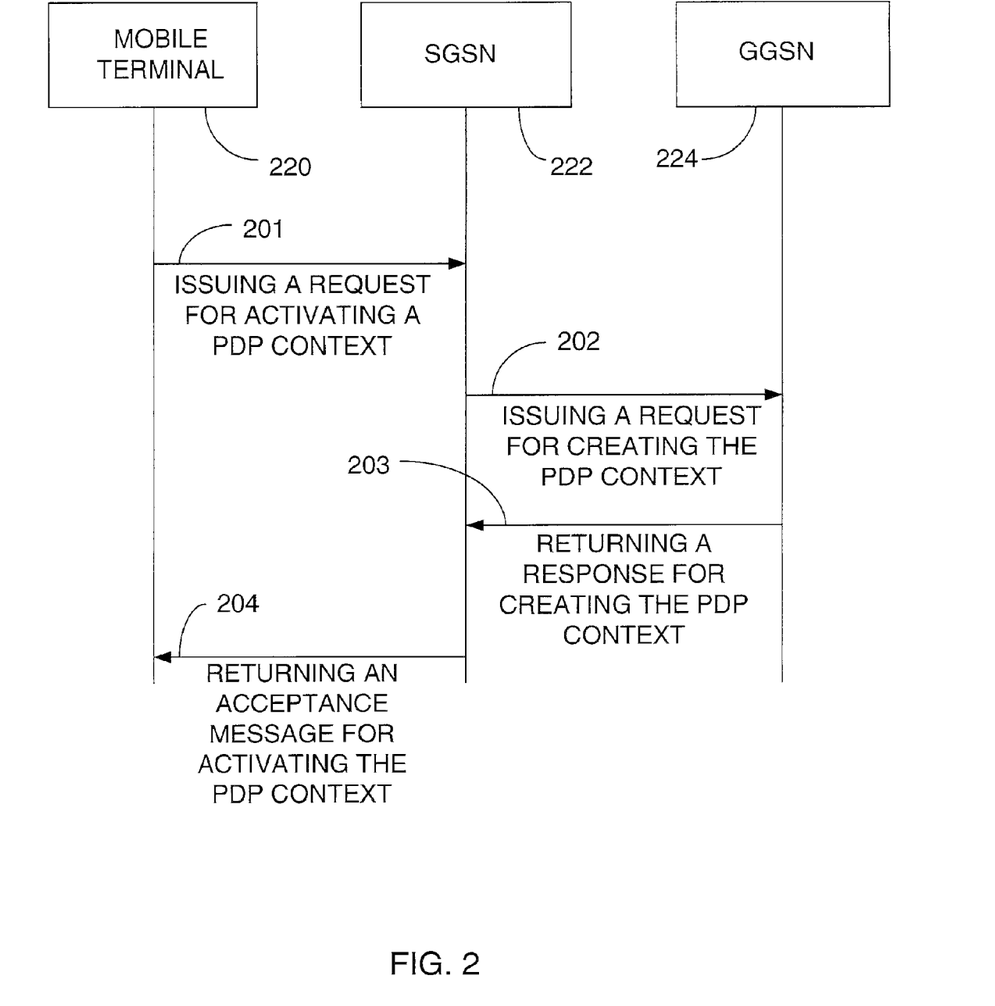
FIG. 2 shows a flow diagram of mobile terminal initiated PDP context activation.

PDP context activation procedure in current GPRS wireless data service includes mobile terminal initiated PDP context activation and network side initiated PDP context activation. FIG. 2 shows a flow diagram of mobile terminal initiated PDP context activation. According to FIG. 2, in step 201, receiving, by a SGSN 222, a request for activating a PDP context issued by a mobile terminal 220;

in step 202, parsing out, by the SGSN, an address of a Gateway GPRS Supporting Node (GGSN) 224 of the mobile terminal based on information provided by the mobile terminal in the request for activating the PDP context, and issuing a request for creating mobile terminal PDP context to the GGSN;

in step 203, allocating, by the GGSN, a dynamic IP address for the mobile terminal and returning a response for creating the PDP context to the SGSN;

in step 204, receiving, by the SGSN, the response of the GGSN for creating the PDP context and sending to the mobile terminal an acceptance message of activating the PDP context.

Wherein, the acceptance message of activating the PDP context includes a dynamic IP address allocated for the mobile terminal. At this moment, a route between the mobile terminal and the GGSN has been established, that is, an IP connection has been established, and packet data transfer may be performed. During the above mobile terminal initiated PDP context activation procedure, the GGSN will allocate a dynamic IP address to the mobile terminal by default, except that the mobile terminal applies for a static address while subscription and the mobile terminal has explicitly stated that it will use static address when activating the PDP context.

The GPRS network also provides a network side PDP context activation procedure, which is a standard procedure defined in 3GPP TS 23.060 and is normally triggered by a downlink packet (that is, a packet transmitted from an external or internal switched network to a mobile client) destined to the IP address of the mobile terminal. The case under which this flow may be used can be explained through an example: if an application service is running on a mobile terminal and other user wishes to access this service, then other user needs to first send a TCP SYN to the IP address of that mobile terminal; at the GGSN, if the mobile terminal has no IP connection, this TCP SYN will trigger an inverse activation to activate the mobile terminal, that is, network side initiated PDP context activation. In practice, network side initiated PDP context activation procedure is rarely used, this is mainly because network side initiated PDP context activation procedure needs a mobile terminal to use a static IP address, however, in reality, mobile operator usually will not sell a static IP address to a mobile terminal and a user will also not buy a static IP address for mobile terminal.

Figure 3:
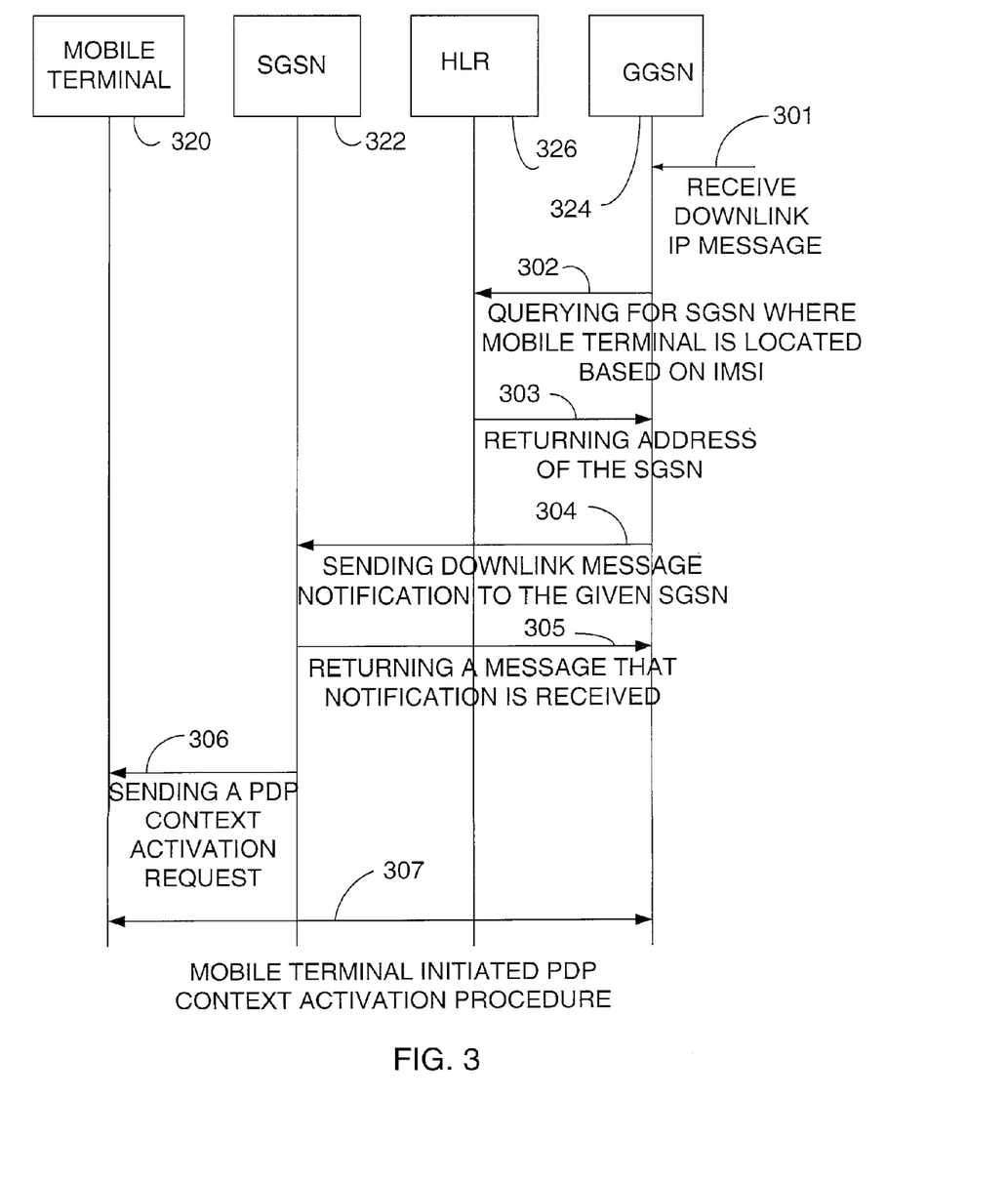
FIG. 3 shows a diagram of current network side initiated PDP context activation procedure.

FIG. 3 shows a diagram of current network side initiated PDP context activation procedure, in step 301, receiving, by a GGSN 324, a downlink IP packet, IP address of destination of the packet corresponds a static IP address of a mobile terminal 320. In this process, if the GGSN 324 is regarded as a last hop router, then all IP packets need to be sent to the mobile terminal 320 will finally be routed to the GGSN 324 in a network segment corresponding to the static IP address;

in step 302, determining, by the GGSN 324, that destination IP address of the downlink IP packet is the static IP address of the mobile terminal 320 based on local configuration information and the mobile terminal has no IP connection, querying for IMSI number of the mobile terminal based on the static IP address of the mobile terminal, and querying a HLR 326 for aSGSN 322 where the mobile terminal is located based on the IMSI number;

in step 303, finding, by the HLR 326, an address of the SGSN 322 where the mobile terminal 320 is currently located and returning it to the GGSN 324;

in step 304, sending, by the GGSN 324, a downlink message notification to a given SGSN 322;

in step 305, returning, by the SGSN 322, a message that the downlink message notification is received;

in step 306, sending, by the SGSN 322, a PDP context activation request to the mobile terminal 320.

At the mobile terminal, it receives the request and starts a mobile terminal initiated PDP context activation procedure shown at step 307.

It can be seen from the above steps that, network side initiated PDP context activation procedure needs a mobile terminal to be bound with a fixed IP address, which wastes limited IP address and service cost is high.

In current instant message service, after a mobile terminal has logged into an instant message server, the instant message server generally only needs to record IP address and user ID, an instant message client of the mobile terminal keeps constant and fixed IP connection with the instant message server, the instant message client continually sends a heartbeat message to the instant message server, and the instant message server keeps the user in a logged-in state, such that the instant message client can continually send and receive instant message. Here, the mobile terminal may still employ the manner of pushing platform mentioned above to reduce data flow.

Whereas in the present invention, since an instant message client of a mobile terminal needs to disconnect an IP network connection when it is inactive and when there is no other network application program that is currently running, and the instant message server is required to, upon receiving a message for the instant message client, notify a mobile network through an interface provided by mobile network to wake up the mobile terminal so as to make the mobile terminal automatically re-establish network connection, corresponding changes need to be made on internal flow for the mobile terminal, the instant message server and the mobile network.

Figure 4:
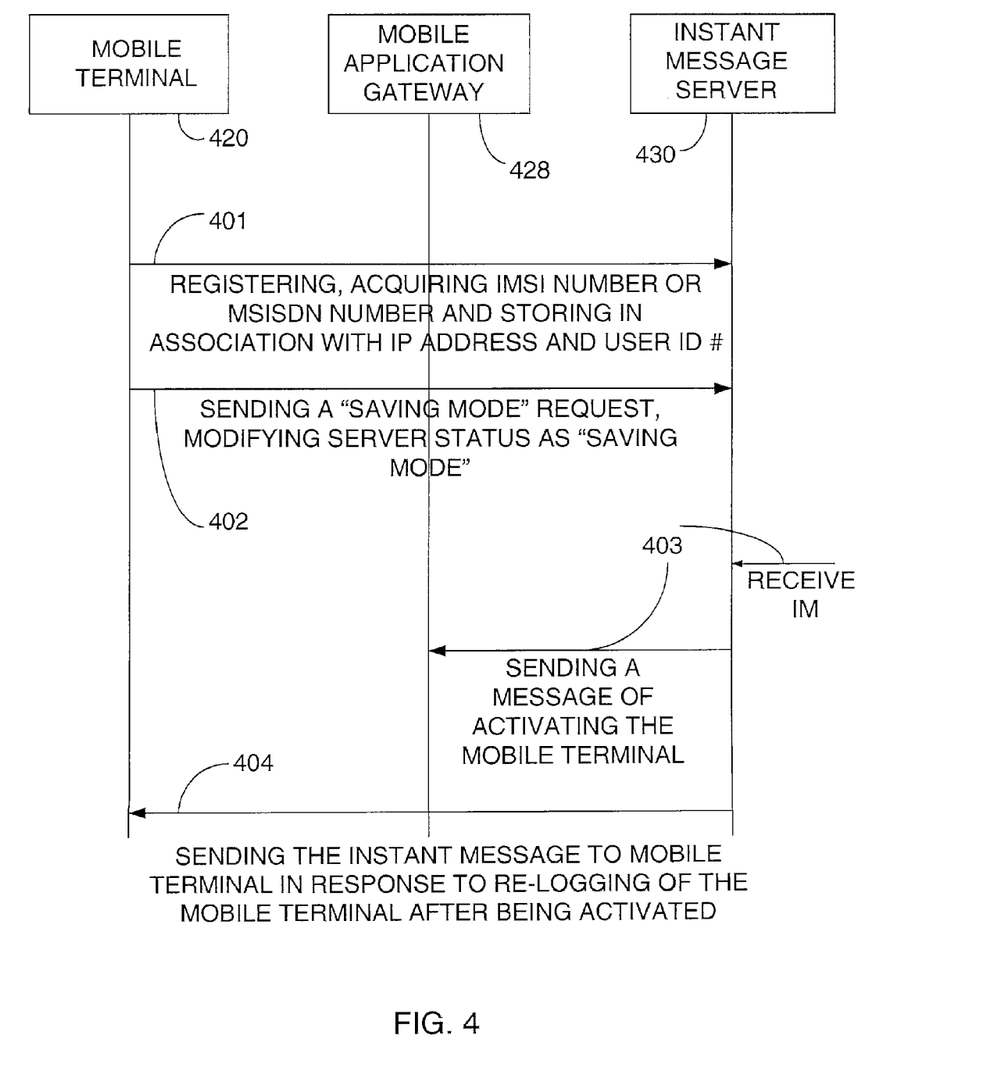
FIG. 4 shows a diagram of a flow at instant message server side of a mobile terminal version instant message application.

First, change on instant message server side is considered. A mobile terminal version instant message application program similar to push version instant message application program may be developed. FIG. 4 shows a diagram of a flow at instant message server side of a mobile terminal version instant message application. According to FIG. 4, in step 401, storing a unique identification number of a mobile terminal 420 in response to login of an instant message client running on the mobile terminal. Within an instant message server 430, IP address of the instant message client may be stored in association with user ID, and at this moment, the instant message client of the mobile terminal may utilize the instant message communication manner in prior art to communicate with other instant message clients;

in step 402, modifying status of the instant message client as "saving mode" in response to receiving a request for transferring status of the instant message client into "saving mode". In case that IM user is idle for a long period of time, the user may choose to log off from the instant message server with a special reason; and the mobile terminal may disconnect IP connection if there is no other network application program that is currently running. Here, "saving mode" represents that an instant message client running on a mobile terminal has no IP connection. "Saving mode" is a special mode defined by the invention, in which the instant message server knows that the mobile terminal has no IP connection, but its IP connection can be activated at any time to access the instant message server so as to receive an instant message; after the instant message server receives "saving mode" status, it should not regard the client as offline due to the client does not send a heartbeat message.

in step 403, sending a request for activating the mobile terminal 420 to a mobile application gateway 428 in response to receiving an instant message sent to the instant message client whose status is "saving mode", the request includes the unique identification number of the mobile terminal. Here, revised network side initiated PDP context activation flow is utilized to request the mobile network to activate the mobile terminal, so as to make the mobile terminal re-establish IP connection. The revised network side initiated PDP context activation flow will be explained in detail below.

in step 404, sending the received instant message to the instant message client in response to the mobile terminal 420 re-logging into the instant message server 430 after being activated.

Then, change on mobile network side may be considered. At mobile network side, existing network side initiated PDP context activation procedure cannot be used, because that activation procedure needs a mobile terminal to use static IP. In an existing network side initiated PDP context activation procedure, since static IP address is used, the GGSN may store static IP address information subscribed by a mobile terminal in local configuration information, such that IMSI information of the mobile terminal can be found through the static IP address when receiving a data message intended to the mobile terminal. It is contemplated by the invention to use a revised network side initiated PDP context activation procedure, in which at network side, a mobile application gateway is used to directly communicate with SGSN rather than with GGSN. The reason is that, when a mobile terminal has not activated a PDP context, the GGSN does not have an inevitable relationship with the mobile terminal. During mobile terminal activation procedure, the SGSN may select different GGSN for activation based on factors such as whether current location of the mobile terminal is at home network or visited network, load condition of a GGSN, etc. The application gateway cannot determine with which GGSN it should communicate. However, current SGSN serving the mobile terminal can always be found through the HLR.

Figure 5:
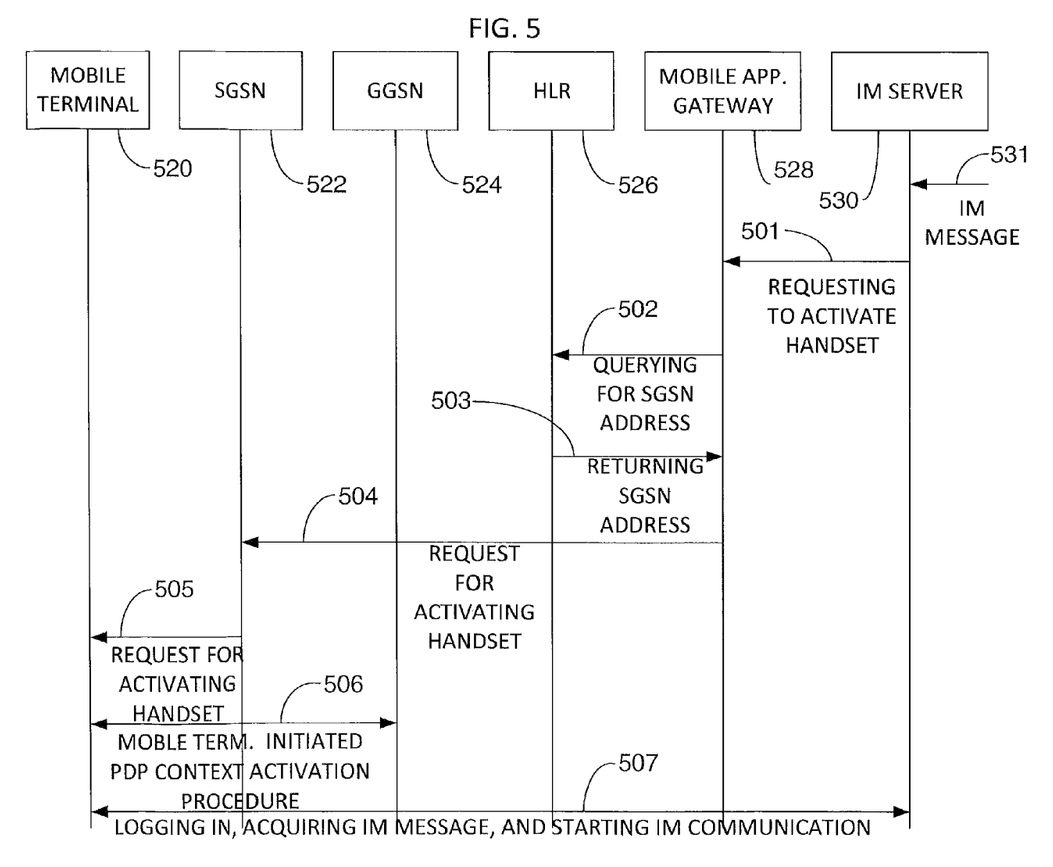
FIG. 5 shows a flow diagram of an improved network side initiated PDP context activation procedure according to the present invention.

FIG. 5 shows a flow diagram of a revised network side initiated PDP context activation procedure according to the present invention, that is, a method of activating a mobile terminal from mobile network side, the revised network side initiated PDP context activation procedure mainly includes flows within a dashed block of the diagram. According to FIG. 5, in step 501, receiving, by a mobile application gateway 528, a request for activating a mobile terminal 520, the mobile terminal has no IP connection, the request includes an unique identification number of the mobile terminal;

in step 502, querying, by the mobile application gateway, a Home Location Register (HLR) 526 for address of a Servicing GPRS Supporting Node (SGSN) 522 where the mobile terminal is located by utilizing the unique identification number of the mobile terminal;

in step 503, returning, by the HLR 526, the queried address of SGSN 522 to the mobile application gateway 528. In this query procedure, the HLR 526 needs to utilize the unique identification number of the mobile terminal.

in step 504, sending, by the mobile application gateway 528, the request for activating the mobile terminal 520 to the SGSN 522. This step may be implemented in various ways. For example, a signaling message may be sent, or a Web Service may be provided on the SGSN 522 which is called by the mobile application gateway 528; even an API may also be provided on the SGSN which is called by the mobile application gateway, and so on.

in step 505, issuing, by the SGSN 522, a request to the mobile terminal 520, requiring the mobile terminal to issue a request for activating PDP context to the SGSN.

in step 506, activating the PDP context for the mobile terminal 520 in response to receiving, by the SGSN 522, the request for activating the PDP context issued by the mobile terminal.

Figure 6:
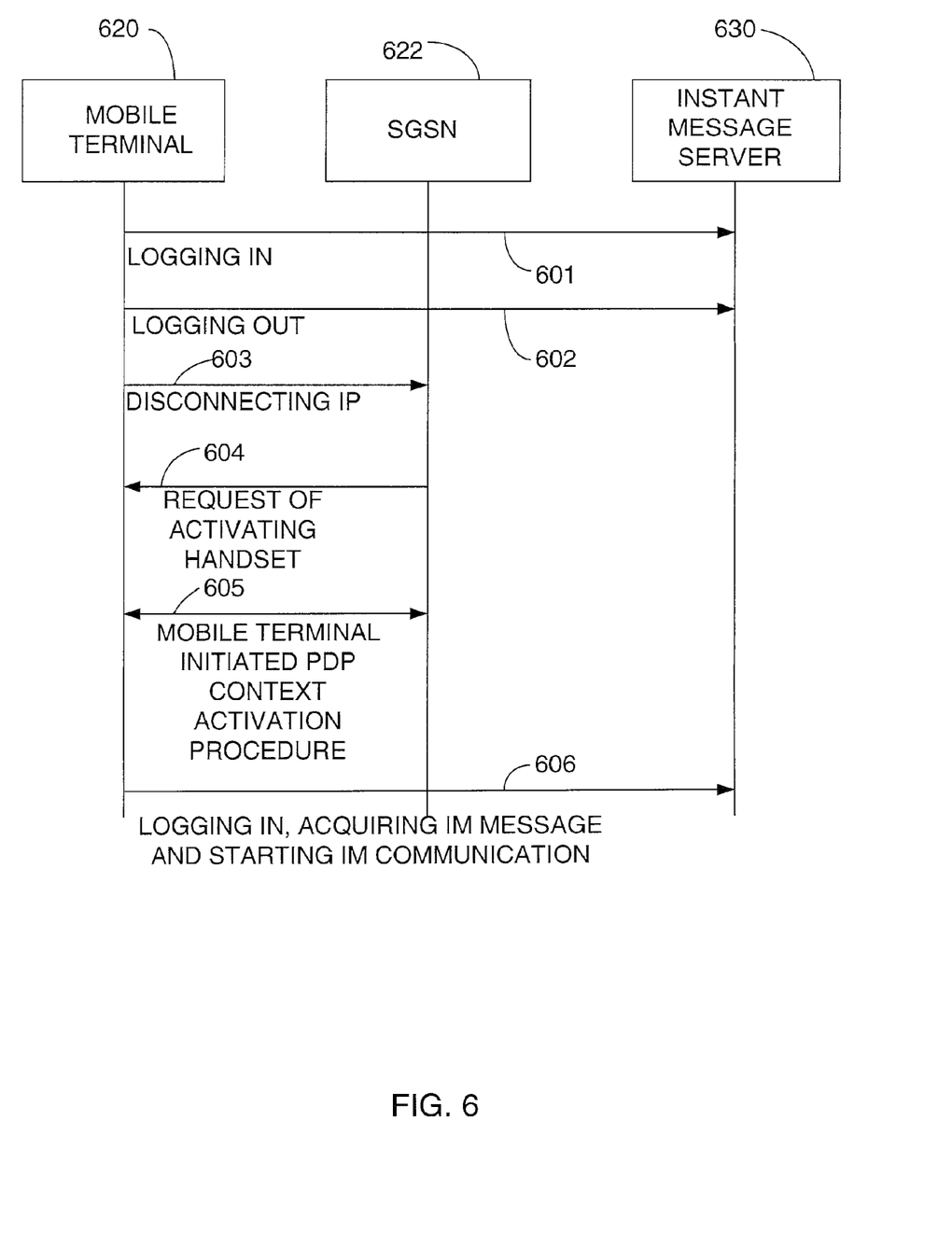
FIG. 6 shows a workflow diagram corresponding to the mobile terminal.

FIG. 5 also shows, at step 507, the interaction between a mobile terminal 520 and an instant message server 530 during a revised network side initiated PDP context activation procedure of the present invention. For the mobile terminal 520, FIG. 6 shows a diagram of a workflow corresponding to the mobile terminal. According to FIG. 6, the flow comprises:

in step 601, providing an user ID number of an instant message client and an unique identification number of a mobile terminal 620 upon logging into an instant message server 630;

in step 602, notifying the instant message server 620 of entering into "saving mode" and closing the instant message client in response to the instant message client being inactive for a period of time and it is confirmed that there is no other network application program that is currently running;

in step 603, disconnecting IP connection in response to there is no other network application program that is currently running;

in step 604, receiving a request, requiring the mobile terminal 620 to initiate a mobile terminal initiated PDP context activation procedure;

in step 605, initiating the mobile terminal 620 initiated PDP context activation procedure toward the SGSN 622/GGSN of the mobile network to acquire an IP address;

in step 606, logging into the instant message server 630, thereby acquiring the instant message sent to it.

Any detailed step of the mobile terminal in FIG. 6 has already been realized in prior art, the main purpose of providing such steps is to, in conjunction with FIG. 4 and FIG. 5, make a reader has a comprehensive impression on the flow of the invention.

Figure 7:
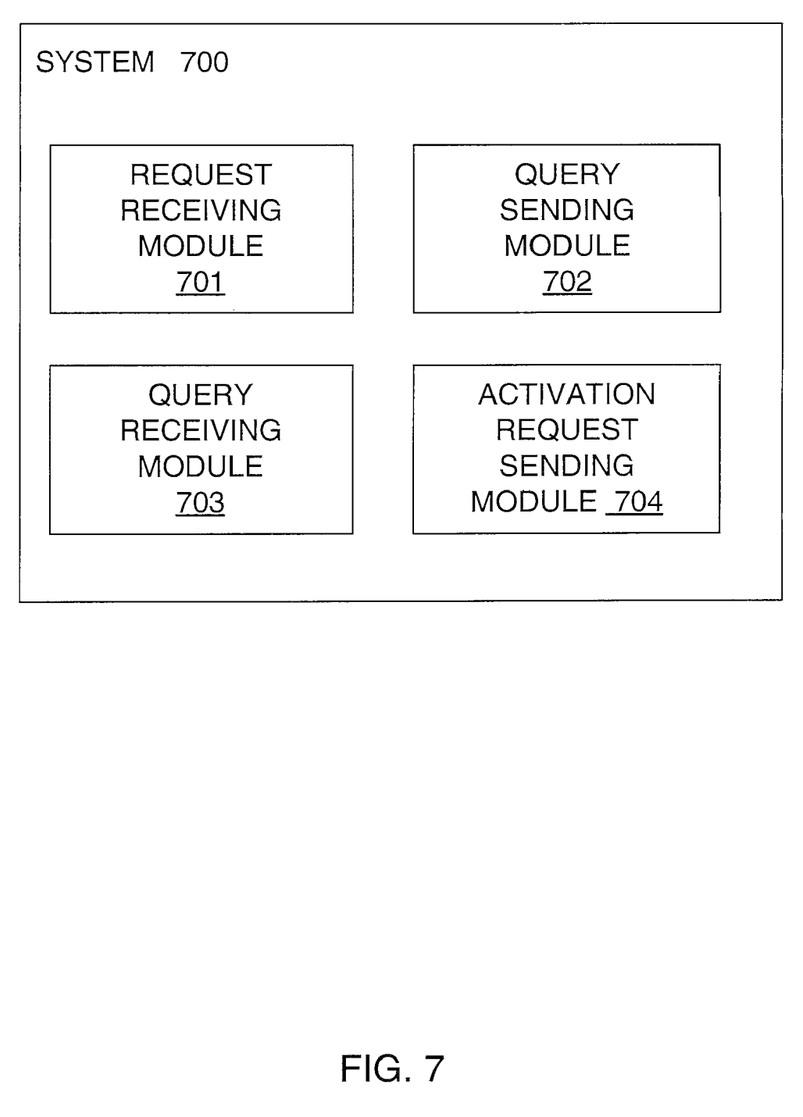
FIG. 7 shows a structural block diagram of the mobile application gateway system.

Under a same inventive conception, the present invention also discloses a mobile application gateway system, FIG. 7 shows a structural block diagram of the mobile application gateway system, according to FIG. 7, the system comprises:

a request receiving module 701 configured to receive a request for activating a mobile terminal, the request includes an unique identification number of the mobile terminal;

a query sending module 702 configured to query a Home Location Register (HLR) for address of a SGSN where the mobile terminal is located by utilizing the unique identification number of the mobile terminal;

a query receiving module 703 configured to receive address of the SGSN queried by the HLR; and an activation request sending module 704 configured to send the request for activating the mobile terminal to the SGSN.

In an embodiment, the query sending module is realized through one of the following manners: sending a signaling message to the HLR; calling a Web Service provided on the HLR; or calling an API provided on the HLR. Furthermore, in an embodiment, the request for activating the mobile terminal received by the request receiving module is issued by an instant message server.

Figure 8:
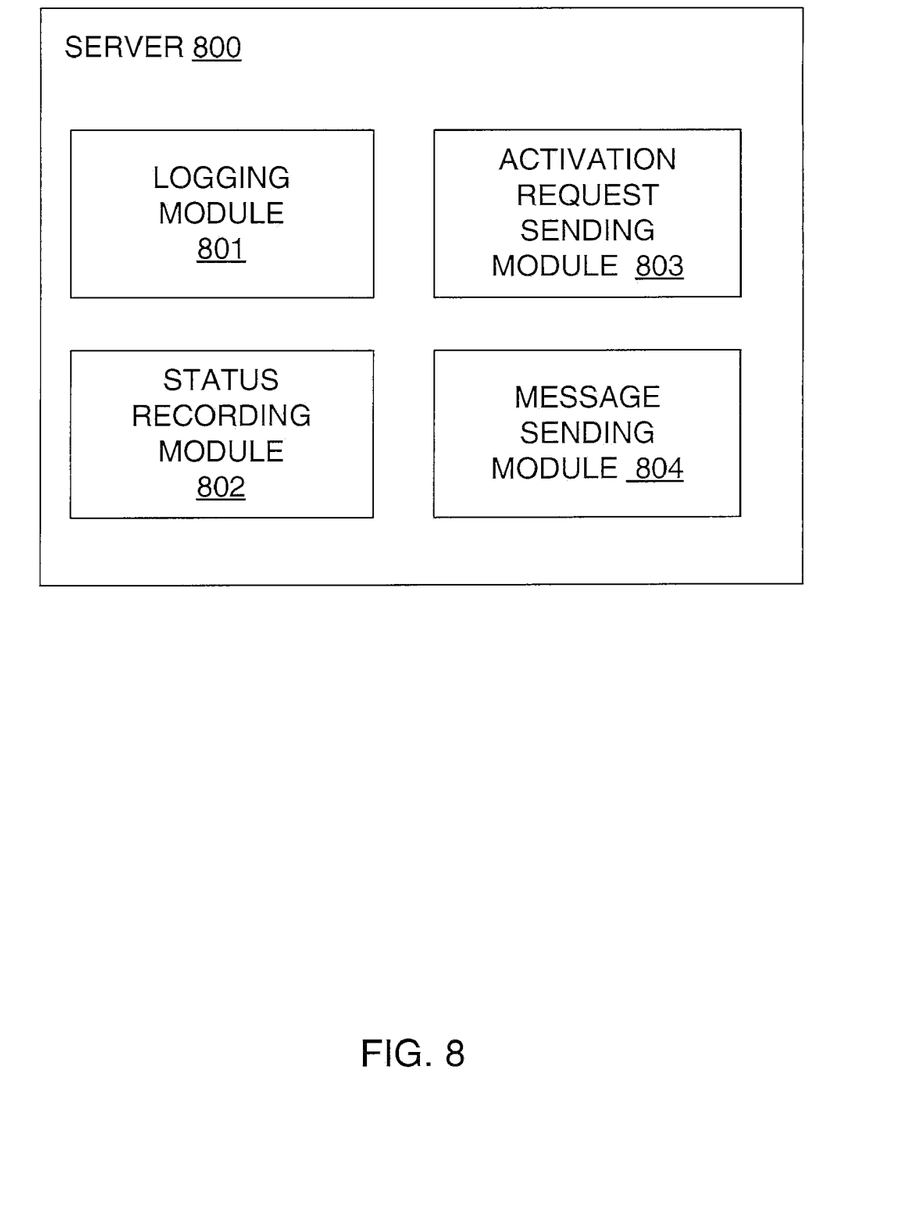
FIG. 8 shows a structural block diagram of the instant message server.

Under a similar inventive concept, the present invention also discloses an instant message server, FIG. 8 shows a structural block diagram of the instant message server, according to FIG. 8, the instant message server comprising:

a logging module 801 configured to store an unique identification number of a mobile terminal in response to receiving login of an instant message client running on the mobile terminal;

a status recording module 802 configured to modify status of the instant message client as "saving mode" in response to receiving a request for transferring status of the instant message client into "saving mode";

an activation request sending module 803 configured to send a request for activating the mobile terminal to a mobile application gateway in response to receiving an instant message sent to the instant message client whose status is "saving mode", the request includes the unique identification number of the mobile terminal.

In an embodiment, the instant message server further comprises: a message sending module 804 configured to send the received instant message to the instant message client in response to the mobile terminal re-logging into the instant message server after being activated.

Wherein, status of the instant message client being "saving mode" represents that the instant message client running on the mobile terminal has no IP connection, but its IP connection can be activated at any time to access the instant message server, so as to receive an instant message.

The "mobile terminal" in the invention refers to a device that can perform voice and data service through a wireless network, including handset, mobile computer with a SIM card, PAD with a SIM card, and so on.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of supporting instant messaging for a mobile terminal, comprising:

receiving, by a mobile application gateway for a packet domain core network which services a plurality of mobile terminals, a request for activating a first mobile terminal of the plurality of mobile terminals to receive a first communication from an instant message server, wherein the first mobile terminal has no IP connection and no static IP address associated with the first mobile terminal, wherein the request is received from the instant message server via an external packet switched network and includes an unique identification number of the first mobile terminal, and wherein the first mobile terminal is running an instant message client requiring continuous availability to receive communications from said instant message server via said external packet switched network;

querying, by the mobile application gateway, a Home Location Register (HLR) for address of a Servicing GPRS Supporting Node (SGSN) where the first mobile terminal is located by utilizing the unique identification number of the first mobile terminal;

returning, by the HLR, the queried address of SGSN to the mobile application gateway;

sending, by the mobile application gateway, the request for activating the first mobile terminal to the SGSN;

issuing, by the SGSN, a request to the first mobile terminal, requiring the first mobile terminal to issue a request for activating a Packet Data Protocol (PDP) context to the SGSN;

activating the PDP context for the first mobile terminal in response to receiving, by the SGSN, the request for activating the PDP context issued by the first mobile terminal; and forwarding said first communication from the instant message server to the first mobile terminal using the activated PDP context.

2. The method according to claim 1, wherein the unique identification number of the first mobile terminal is one of Mobile Subscriber ISDN number (MSISDN number) and International Mobile Subscriber Identification number (IMSI number) of the first mobile terminal.

3. The method according to claim 1, wherein the step of activating the PDP context for the first mobile terminal in response to receiving, by the SGSN, the request for activating the PDP context issued by the first mobile terminal comprises:

receiving, by the SGSN, the request for activating the PDP context issued by the first mobile terminal;

parsing out, by the SGSN, an address of a Gateway GPRS Supporting Node (GGSN) of the first mobile terminal based on information provided by the first mobile terminal in the request for activating the PDP context, and issuing a request for creating mobile terminal PDP context to the GGSN;

allocating, by the GGSN, a dynamic IP address for the first mobile terminal and returning a response for creating the PDP context to the SGSN; and receiving, by the SGSN, the response of the GGSN for creating the PDP context and sending to the first mobile terminal an acceptance message of activating the PDP context.

4. The method according to claim 3, wherein the acceptance message of activating the PDP context includes a dynamic IP address allocated for the first mobile terminal.

5. The method according to claim 1, wherein the step of sending, by the mobile application gateway, the request for activating the first mobile terminal to the SGSN is realized through one of the following manners:

sending, by the mobile application gateway, a signaling message to the SGSN;

calling, by the mobile application gateway, a Web Service provided on the SGSN; or calling, by the mobile application gateway, an API provided on the SGSN.

6. A mobile application gateway system for a packet domain core network, comprising:

at least one processor;

a memory communicatively coupled to the at least one processor and storing instructions executable on the at least one processor;

a request receiving module configured to receive a request for activating a first mobile terminal of a plurality of mobile terminals serviced by the mobile application gateway to receive a first communication from an instant message server, the mobile terminal having no IP connection and no static IP address associated with the mobile terminal, wherein the request is received from the instant message server via an external packet switched network and includes a unique identification number of the first mobile terminal, and wherein the first mobile terminal is running an application program client requiring continuous availability to receive communications from the instant message server via the external packed switched network;

a query sending module configured to query a Home Location Register (HLR) for address of a Servicing GPRS Supporting Node (SGSN) where the first mobile terminal is located by utilizing the unique identification number of the first mobile terminal;

a query receiving module configured to receive address of the Servicing GPRS Supporting Node (SGSN) queried by the HLR; and an activation request sending module configured to send the request for activating the first mobile terminal to the SGSN, wherein responsive to the activation request the SGSN issues a request to the first mobile terminal requiring the first mobile terminal to issue a request for activating a Packet Data Protocol (PDP) context to the SGSN, and the SGSN activates the PDP context for the first mobile terminal responsive to receiving the request for activating a PDP context from the first mobile terminal;

wherein the mobile application gateway forwards said first communication from the instant message server to the first mobile terminal using the activated PDP context.

7. The mobile application gateway system according to claim 6, wherein the unique identification number of the first mobile terminal is one of Mobile Subscriber ISDN number (MSISDN number) and International Mobile Subscriber Identification number (IMSI number) of that mobile terminal.

8. The mobile application gateway system according to claim 6, wherein the activation request sending module is realized through one of the following manners:

sending a signaling message to the SGSN;

calling a Web Service provided on the SGSN; or calling an API provided on the SGSN.

* * * * *